United States Patent
Mack et al.

(10) Patent No.: US 7,447,254 B1
(45) Date of Patent: Nov. 4, 2008

(54) SELF-CORRELATING PSEUDO-NOISE PAIRING

(75) Inventors: Robert William Eugene Mack, San Jose, CA (US); Stephen O'Connor, Mountain View, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 763 days.

(21) Appl. No.: 10/811,361

(22) Filed: Mar. 25, 2004

(51) Int. Cl.
*H04B 1/00* (2006.01)

(52) U.S. Cl. .................. 375/146; 375/295; 375/296; 375/316; 375/143; 375/367; 375/147; 375/149; 375/152; 375/346

(58) Field of Classification Search .......... 375/295, 375/296, 316, 143, 146, 147, 149, 152, 346, 375/367

See application file for complete search history.

(56) References Cited

U.S. PATENT DOCUMENTS

| | | | | |
|---|---|---|---|---|
| 3,978,406 A * | 8/1976 | Matsumoto et al. | ......... | 375/281 |
| 4,032,885 A * | 6/1977 | Roth | ......... | 708/212 |
| 4,205,302 A * | 5/1980 | Godo | ......... | 708/212 |
| 4,638,497 A * | 1/1987 | Komatsu et al. | ......... | 375/368 |
| 4,943,975 A * | 7/1990 | Kurihara et al. | ......... | 375/150 |
| 5,619,501 A * | 4/1997 | Tamer et al. | ......... | 370/392 |
| 5,862,172 A * | 1/1999 | Sugita et al. | ......... | 375/142 |
| 5,930,290 A * | 7/1999 | Zhou et al. | ......... | 375/143 |
| 6,035,177 A * | 3/2000 | Moses et al. | ......... | 725/22 |
| 6,064,695 A * | 5/2000 | Raphaeli | ......... | 375/230 |
| 6,212,219 B1 * | 4/2001 | Shou et al. | ......... | 375/130 |
| 6,442,191 B1 * | 8/2002 | Strong | ......... | 375/146 |
| 6,493,376 B1 * | 12/2002 | Harms et al. | ......... | 375/130 |
| 6,519,275 B2 * | 2/2003 | Callaway et al. | ......... | 375/140 |
| 6,798,825 B1 * | 9/2004 | Horne | ......... | 375/146 |
| 6,876,692 B2 * | 4/2005 | Shi et al. | ......... | 375/141 |
| 6,925,105 B1 * | 8/2005 | Partyka | ......... | 375/133 |
| 2003/0023881 A1 * | 1/2003 | Fitzgibbon et al. | ......... | 713/202 |
| 2003/0128747 A1 * | 7/2003 | Poon et al. | ......... | 375/148 |
| 2004/0095954 A1 * | 5/2004 | Varney et al. | ......... | 370/444 |
| 2004/0234005 A1 * | 11/2004 | Mayrargue | ......... | 375/299 |
| 2005/0175072 A1 * | 8/2005 | Mack et al. | ......... | 375/146 |

* cited by examiner

*Primary Examiner*—Chieh M. Fan
*Assistant Examiner*—Siu M Lee
(74) *Attorney, Agent, or Firm*—Blakely, Sokoloff, Taylor & Zafman LLP

(57) ABSTRACT

A method of transmitting communications codes is used in spread spectrum communications systems. The method includes transmitting a first pseudo-noise code, and transmitting a second pseudo-noise code, wherein the second pseudo-noise code is a time-reversed version of the first pseudo-noise code. A device includes a first shift register to store a first code and a second register to store a second code in a time-reversed version. A comparison circuit then compares the two codes and a result is output.

18 Claims, 8 Drawing Sheets

SELF-CORRELATING PSEUDO-NOISE PAIRING

FIELD OF THE INVENTION

This invention relates to spread spectrum communications, more particularly to generation, transmission and reception of pseudo-noise codes in spread spectrum communications.

BACKGROUND

Spread spectrum systems use wide-band, low spectral density signals to transmit information in such a manner as to make the signals appear to be noise. The term 'spread spectrum' refers to the fact that the transmitted signal bandwidth is greater than the information bandwidth, and the information signals are 'spread' across the transmitted signal bandwidth.

Spread spectrum signals use codes that dictate the manner in which the data transmission signals are spread across the spectrum used to transmit the signals. These codes may be referred to as pseudo-random noise (pseudo-noise) codes, because while they appear to be white noise, they are actually specific codes used to modulate the carrier signal at the transmitter and the receiver. Detection and analysis of the codes allows the codes to be used to identify data values, detect specific events, etc.

Currently, spread spectrum systems mainly follow one of two techniques of spreading. The first is usually referred to as direct sequence spread spectrum, or DSSS. The second technique of frequency spreading may be referred to as frequency hopping. Frequency hopping spread spectrum systems generally divide the available bandwidth into some number of channels and then hop between these channels according to the pseudo-noise code.

In order for these spread spectrum systems to work, both the transmitter and the receiver need to use the same pseudo-noise codes. Currently, a receiver responds to a small set of known pseudo-noise codes using a piece of dedicated hardware with storage for the reference codes. Generally, a correlation function generates a comparison of a full 64-bit reference code against an over sampled received input stream at every clock and the counting the bit matches. A high or low peak occurs in the match count when the two overlap. Supporting multiple pseudo-noise codes requires comparison of multiple 64-bit reference codes for each sample point of the received input stream.

Large amounts of logic are required to create 64-bit, parallel comparators. Expanding the set of codes has a large, negative impact on the logic area and complexity required. This increases the power consumption of the devices, which is detrimental for many portable wireless devices with limited power consumption requirements that are often the users of spread spectrum communications.

In addition, current spread spectrum systems have a requirement that the receiver and transmitter both know the pseudo-noise code being used. Systems that have to perform a comparison have a set of 'good' or valid pseudo-noise codes against which to compare. There exists no current way for a transmitter to talk to a receiver without both ends having the proper code in some form prior to transmission.

SUMMARY

One embodiment of the invention is a method of transmitting pseudo-noise codes. The method transmits a first pseudo-noise code and then transmits a second pseudo-noise code that is a time-reversed version of the first pseudo-noise code.

Another embodiment of the invention is a method of receiving a communications codes. The method receives a transmission including first and second pseudo-noise codes formed into a pair. The first and second pseudo-noise codes are then compared. A match is detected based upon a match count peak.

Another embodiment of the invention is a device. A receiver receives a pseudo-noise code pair. The device also includes a first register to store a first code and a second register to store a second code in time-reversed order. A comparison circuit compares contents of the first register to contents of the second register and outputs a result.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
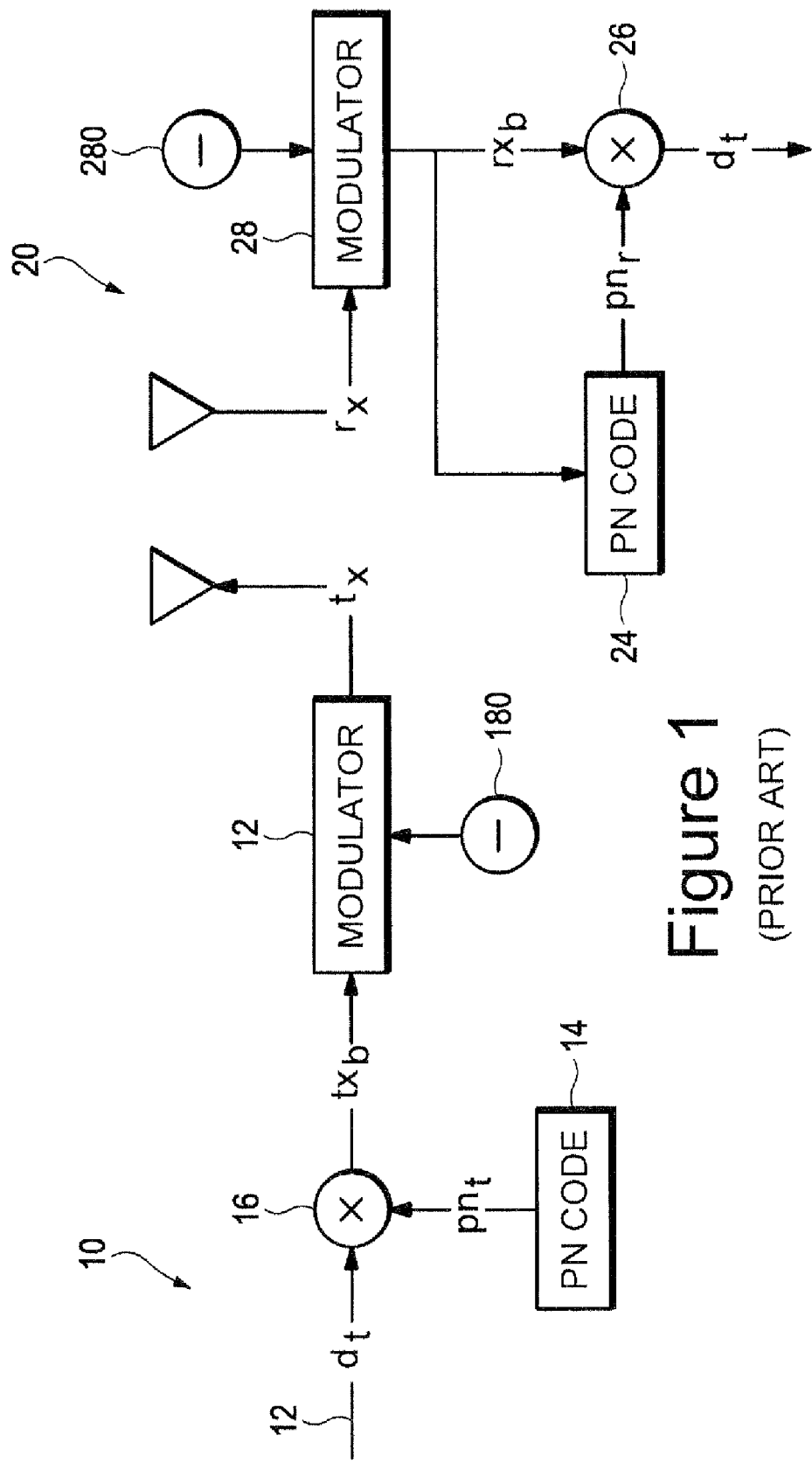
FIG. 1 shows an example of a spread spectrum communications system.

FIG. 1 shows an embodiment of a spread spectrum communications system. Spread spectrum systems generally perform spreading by direct sequence spread spectrum (DSSS) or frequency hopping. DSSS systems use the pseudo-noise codes to directly modulator the carrier, thereby directly setting the transmitted radio frequency (RF). The result of modulating an RF carrier with a code sequence produces a signal centered on the carrier frequency. DSSS systems use the pseudo-noise codes to directly modulator the carrier, thereby directly setting the transmitted radio frequency (RF). The result of modulating an RF carrier with a code sequence produces a signal centered on the carrier frequency. Once the codes are determined by the receiver, the receiver can use the codes to analyze the modulations in the signal to extract data values, detect an event, etc.

Frequency hopping spread spectrum systems generally divide the available bandwidth into some number of channels. The transmitter then 'hops' from frequency to frequency according to the sequence dictating by the pseudo-noise code. The receiver, upon receiving the pseudo-noise code, then also has the hopping sequence needed and can hop in unison with the transmitter, allowing it to receive the signals on the correct frequencies. The data is received in bursts at each hopping during what is referred to as 'dwell time,' which is the amount of time that the transmitter transmits on that frequency.

FIG. 1 shows a transmitter 10 that uses spread spectrum techniques to transmit input data $d_t$ to a receiver 20 as transmission data $t_x$. For a direct sequence spread spectrum system, shown here, the input data is multiplied at 16 by the pseudo-noise code sequence pseudo-noise$_t$ generated by the transmission correlator 14. Multiplication may include convolution, or other methods of combining the transmission data with the pseudo-noise codes. This results in a transmission base band signal $tx_b$. The transmission base band signal is then modulated to radio frequencies using RF input 180 and transmitted as tx.

A receiver 20 then receives the transmitted data as $r_x$ and demodulates it with demodulator 28 having RF input 280. The demodulated data $rx_b$ is then processed to extract the pseudo-noise code sequence pseudo-noiser at correlator 24 and this is then applied to the data at 26 to determine the output data $d_r$. The pseudo-noise code sequence pseudo-noise, must be the same as the pseudo-noise sequence pseudo-noise, or the communications will not work.

Both the transmitter and the receiver need to use the same pseudo-noise codes. Currently, a receiver responds to a small set of known pseudo-noise codes using a dedicated hardware circuit such as 24, referred to here as a correlator. The correlator generally has storage for the reference codes. For a 64-bit pseudo-noise code, the match count output of the correlation function is generated by comparing a full 64-bit reference code against an over sampled received input stream and the counting the bit matches. The reference is generally compared at every clock against the previous 64-bit sample. An example of this is shown in FIG. 2.

Figure 2:
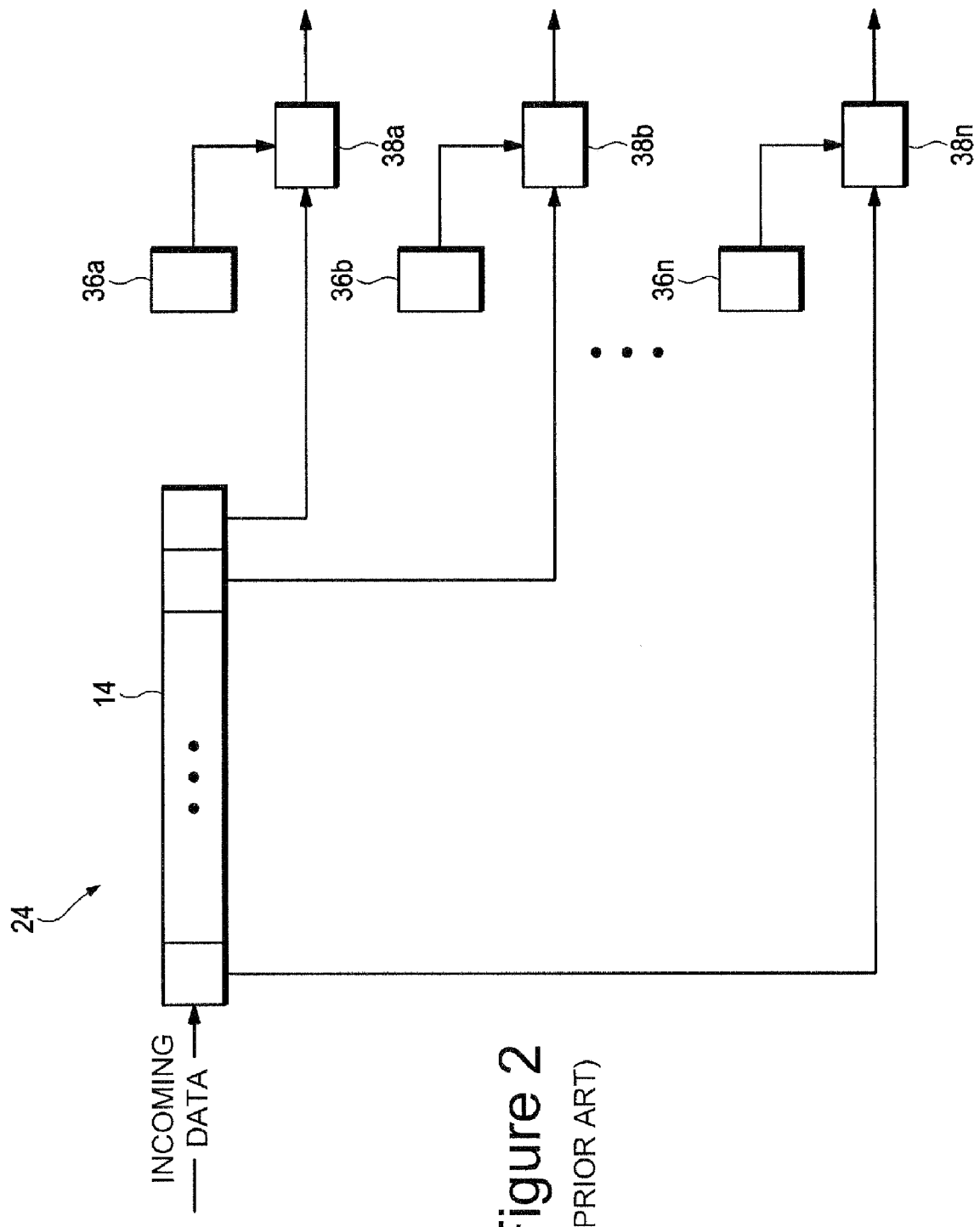
FIG. 2 shows an embodiment of a conventional code comparison circuit.

In FIG. 2, the data comes into the correlator 24 of FIG. 1. This data is stored in a register 14, typically an oversampling shift register. Each bit of this data is then compared individually against each bit of the reference code. Typically, the reference code is stored in a set of data latches, which may be flip-flops or any other type of storage, such as 36a-36n. As used here, the variable n indicates the size of the code. This corresponds to the number of data latches and the size of the register used.

Each bit of the reference code is then compared against each bit of the incoming code in parallel at comparators 38a-38n. This requires at least one data latch 36 and comparison logic 38 for each bit of the code. As can be seen in FIG. 2, this requires a significant number of components and a rather large portion of the available space on an integrated circuit. This contributes to the overhead of the circuit design, increasing costs and manufacturing complexity. For these reasons and others, expansion to several reference codes becomes problematic.

When the received stream and the reference code overlap correctly, a high or low peak occurs in the match count. Supporting multiple pseudo-noise codes would require comparison of multiple 64-bit reference codes for each sample point of the received input stream. An example of this comparison and match-count result for current systems is shown in FIG. 3.

Figure 3:
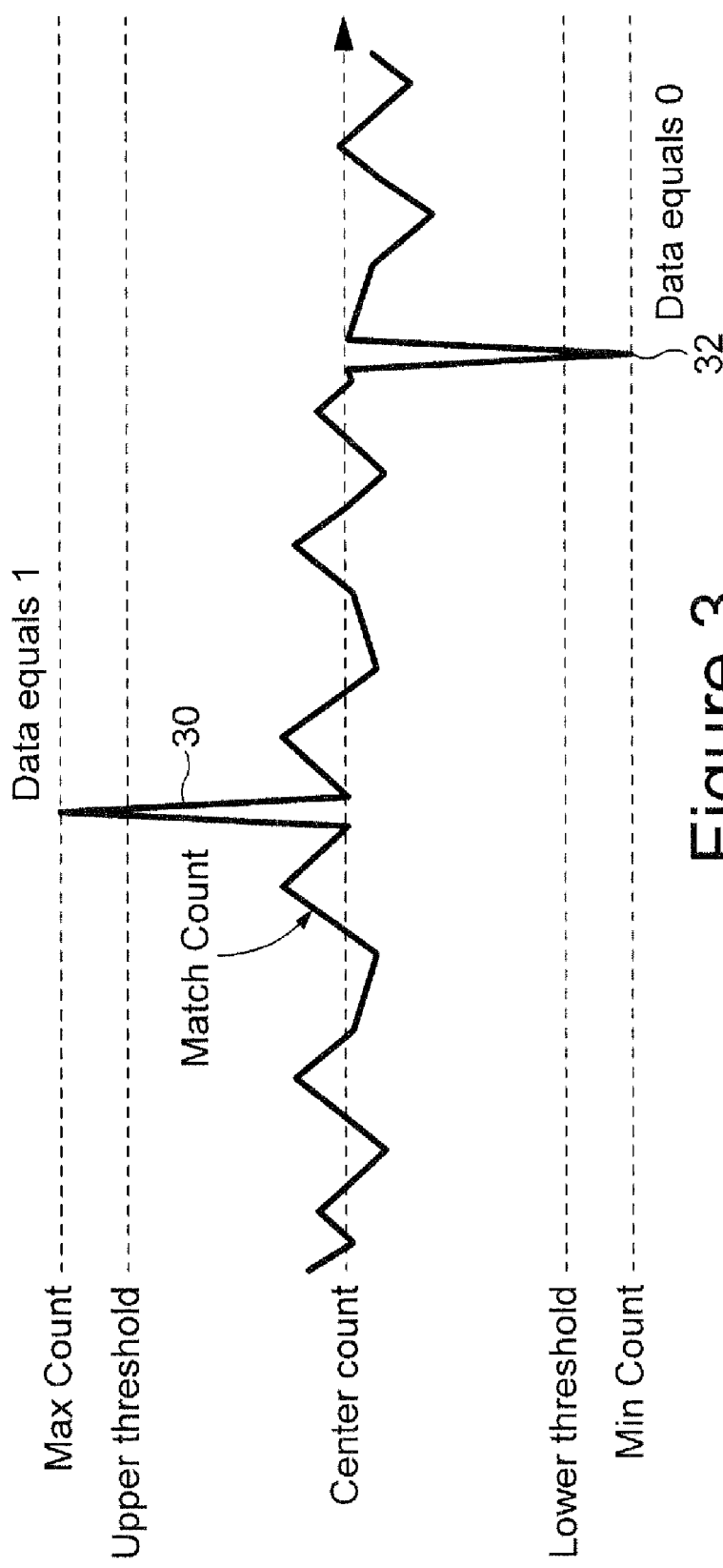
FIG. 3 shows an example of a match-count output for a conventional embodiment using pseudo-noise codes.

As can be seen in FIG. 3, the match count has a high peak 30 for a match between the incoming code and the reference code and a low peak 32 for a match between the incoming code and an inverse of the reference code. In order to allow for error correction in other layers of the communication system protocol, the match count may be determined to be a 64-bit match for a 64-bit code if some range of bits match. For example, a match count peak indicating 58 bits match out of 64 bits may be considered a peak. The actual selection of the threshold is left up to the system designer.

As mentioned above, the received data is compared against stored reference values at every possible alignment, and expanding the set of codes has a large, negative impact on the logic area and complexity required. Large amounts of logic are required to create 64-bit, parallel comparators. The received code is compared to the reference value at reception, so parallel processing is required. This increases the number of components needed and in turn increases the power consumption of the devices, which is counter to one of the many users of spread spectrum signals, portable wireless devices with limited power consumption requirements.

It is possible to transmit a pseudo-noise code as a first code and then transmit the same pseudo-noise code in time-reversed order as a second code. This code pair can then be used to detect an initial correlation upon reception, and the analysis of the code can be processed off-line. Time-reversed as used here means that the order of the second code would start with the last bit transmitted and reverse the order to the first bit transmitted. For example, a code sequence of 00110101 would be time reversed as 10101100.

The codes used should have strong auto-correlation properties. This allows an initial analysis of the code pairs to detect a correlation peak. Once the correlation peak is detected, the code causing the peak is stored for analysis separate from reception. This simplifies both the hardware needed for analysis, as well as the procedure used.

As will be discussed in more detail later, the codes used as reference values should have low cross-correlation properties. This avoids a 'false positive' of matching reference values. If the current code under analysis has errors, it is undesirable that the 'correct' portion of the code match more than one reference value. To avoid this, the reference codes should have low cross-correlation. The degree of cross-correlation allowed will depend upon the system designer and the particular embodiment of the correlator in the receiver.

Figure 4:
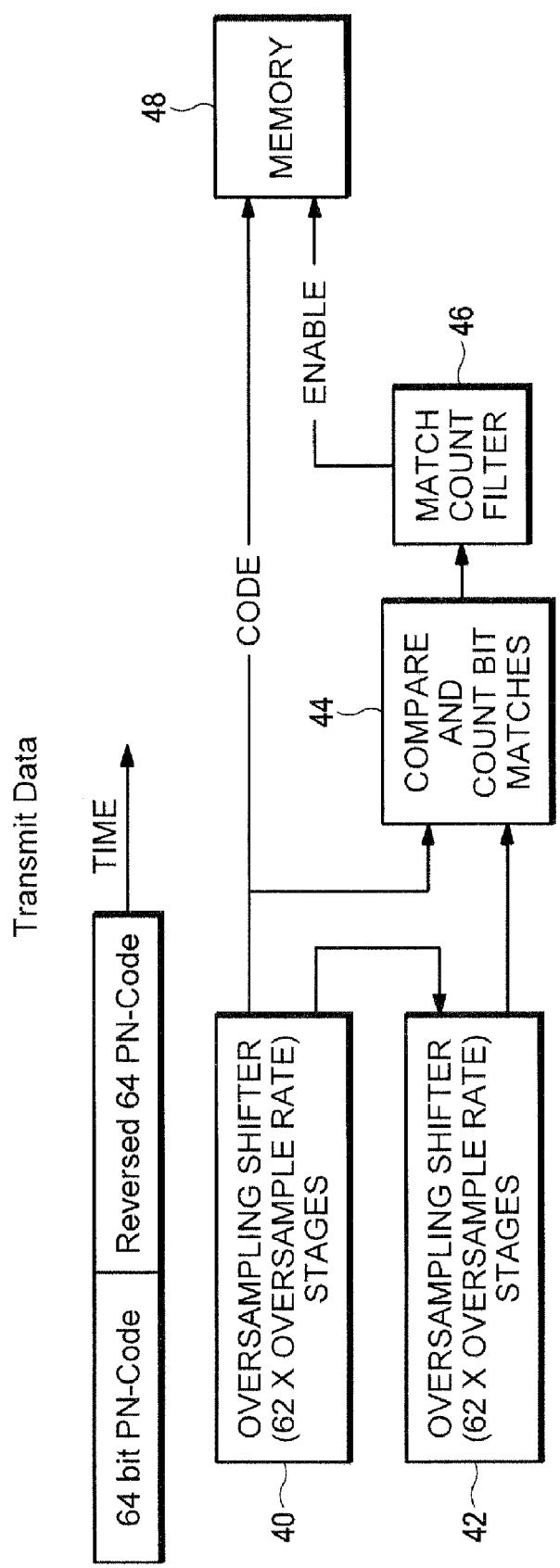
FIG. 4 shows an embodiment of a receiver correlator.

An example of a correlator is shown in FIG. 4. The input data stream is received at a first register 40. This register may be one of many different types of storage, including shift registers, buffers, data latches, etc. In one embodiment, the registers may be shift registers.

In another embodiment, the shift registers maybe oversampling shift registers that sample the incoming data at a rate of N×the oversampling rate, where N is the dimension of the register. For example, for a 64-bit code reception, the sampling rate would be 64×the oversampling rate.

In one embodiment, the data received at the first register is transferred to a second register 42. The second register would shift in the opposite direction as the first. As the first code is shifted out of the first register to the second register, the data would seem to be moving from right to left into the second register as the second half of the code pair is moving into the first register from left to right.

The second code is a time-reversed version of the first and the first code has been stored in a time-reversed order as well, so correlation becomes a simplified operation. A comparison circuit 44 determines if there is a match between the first and second codes. If there is a match, the match count peak may need to be filtered to avoid false positives. This would be accomplished by match count filter 46.

If there is a strong correlation peak detected upon the comparison, the code causing the peak is stored for analysis off-line. This may be enabled by codes being sent to the memory 48 as they are received and then an enable signal may be sent from the match count filter 46 upon verification of a 'good' or valid code pair. The enable signal would cause the memory to store the code. In one embodiment, the memory is any type of storage. In another embodiment, the memory may be a random access memory (RAM) or other type of lookup table. The use of such a memory is enabled by the ability to separate code reception and code comparison against reference values. Being able to do the comparison off-line from the reception eliminates the need for the massive, multiple-bit comparisons required by the current art.

Figure 5:
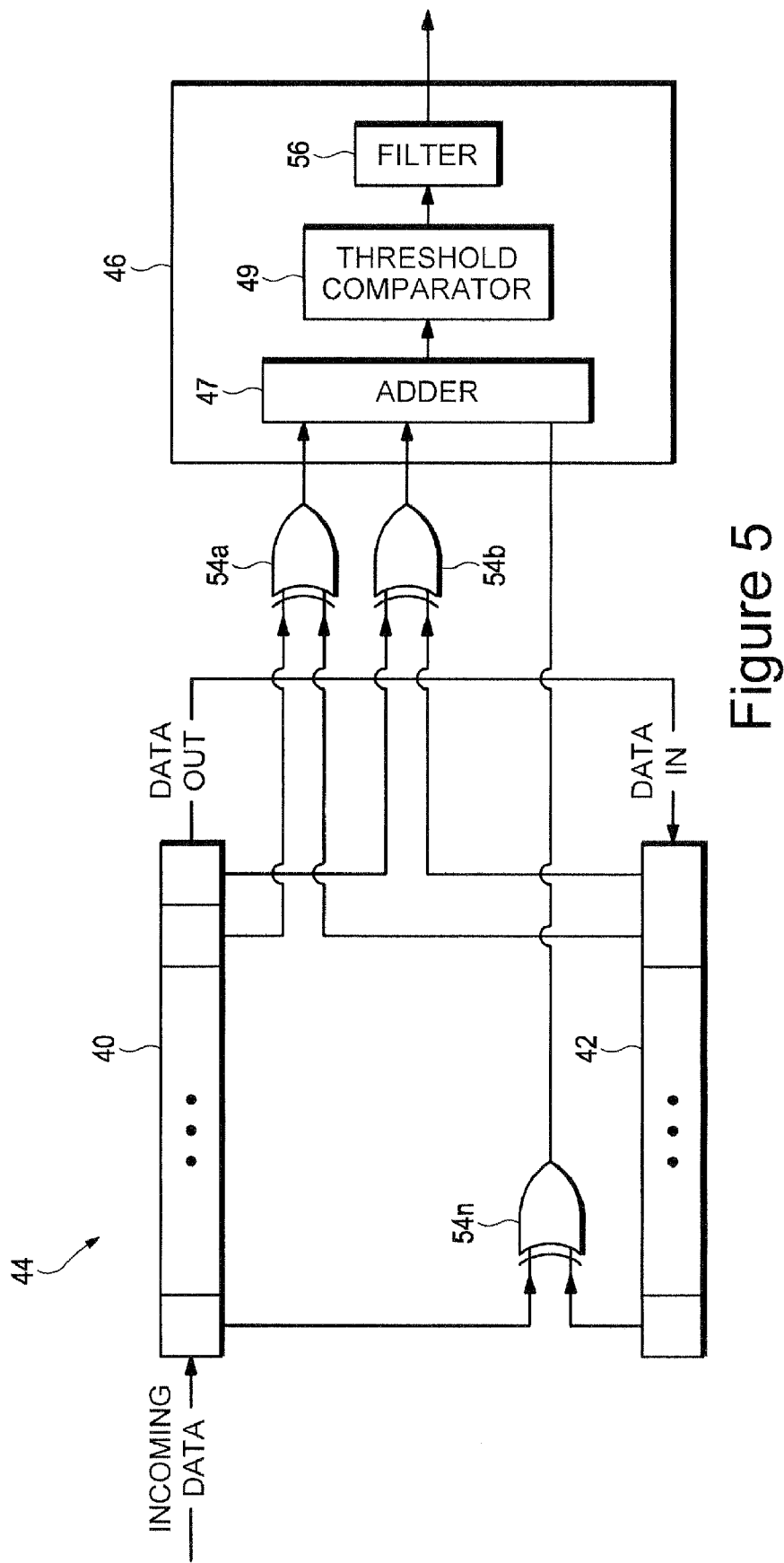
FIG. 5 shows a match-count output for an embodiment of a receiver correlator.

An embodiment of a circuit that may make the initial detection is shown in FIG. 5. The registers 40 and 42 are assumed to each have half of the incoming code pair stored within them. As can be seen, the data out from register 40 is the data in for register 42. Each bit of the code 'halves' is then compared to the corresponding bits of the other half through an exclusive OR operation, shown here utilizing XOR gates 54a through 54n. If the bits match, the XOR results in a 1. If the bits do not match, the result is a 0. The use of an XOR process is merely one example of how matches can be detected.

Figure 6:
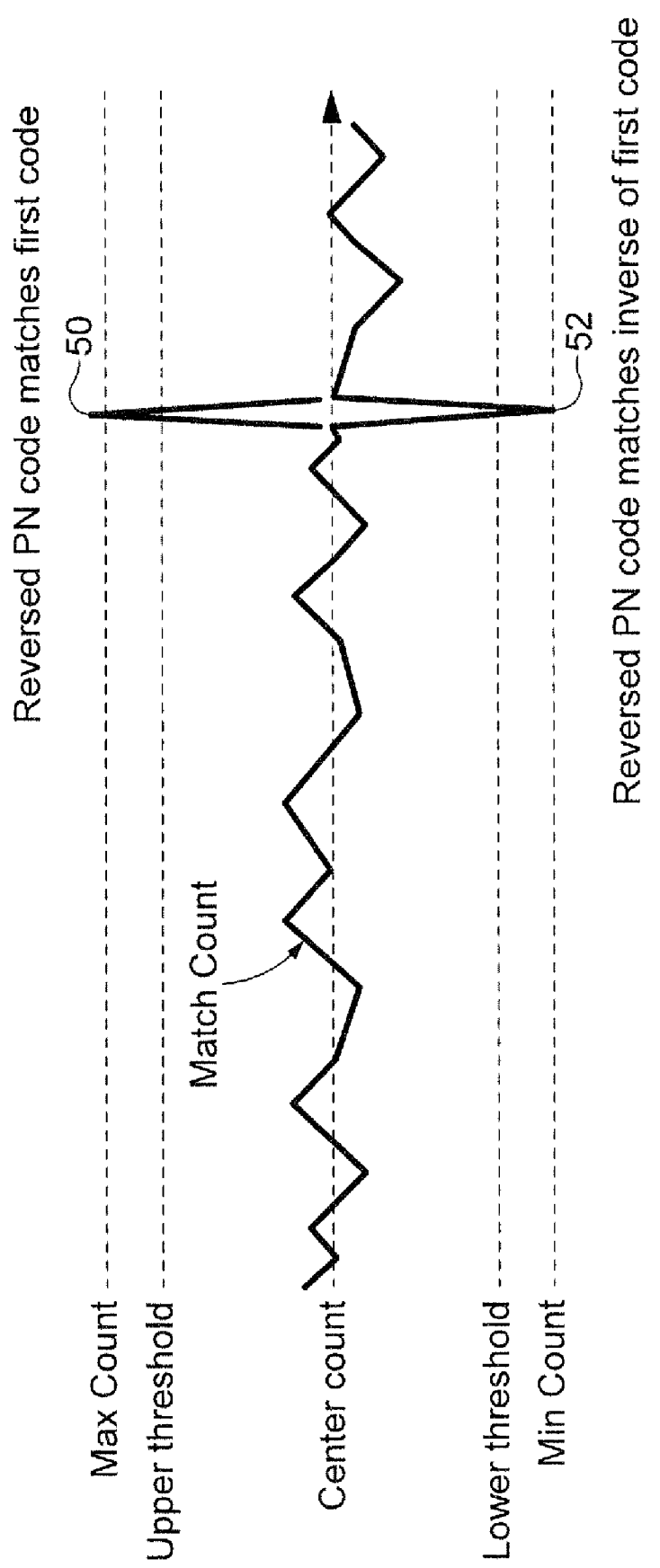
FIG. 6 shows an example of a match-count output using pseudo-noise codes.

The results of the matching processes are then sent to the match count filter 46, which produces a match or no-match result. The match count filter may include an adder 47 that adds up the match count, or match sum, of the outputs of the XOR gates. The match count or sum will then be compared to a threshold value that determines whether there is a possible match at threshold comparator 49. As can be seen in FIG. 6, the two peaks 50 and 52 may be matches, as they have exceeded the threshold values shown. The possible match is then filtered by filter 56 to determine if it is an actual match or a 'false positive.'

The filter 56 may apply one of many possible processes. For example, in order to determine that the match peaks are actually occurring every N bits, the filter may determine whether there were any peaks crossing the threshold N bit times before that particular crossing. Similarly, the filter may determine if there are any peaks crossing the threshold N bit times after that particular crossing.

Figure 7A:
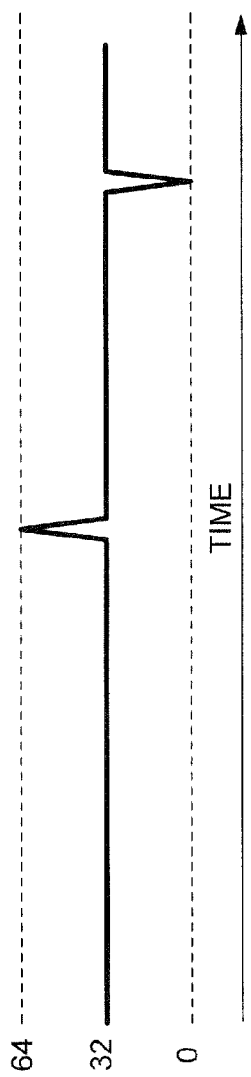
FIGS. 7a-7c show graphical representations of filter outputs for different incoming signals.
Figure 7C:
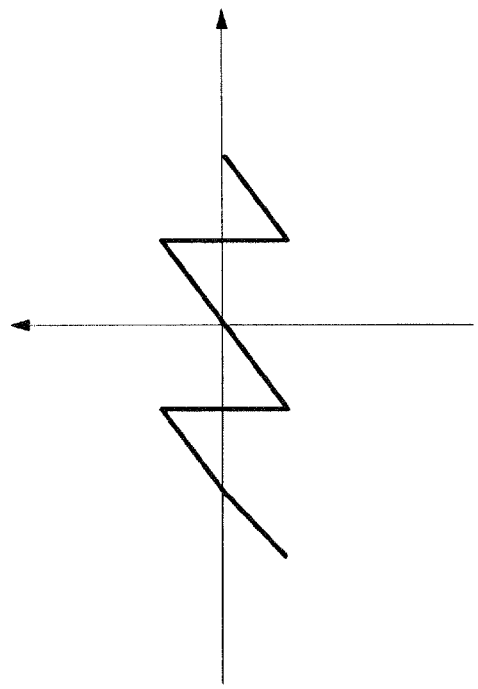
Figure 7B:
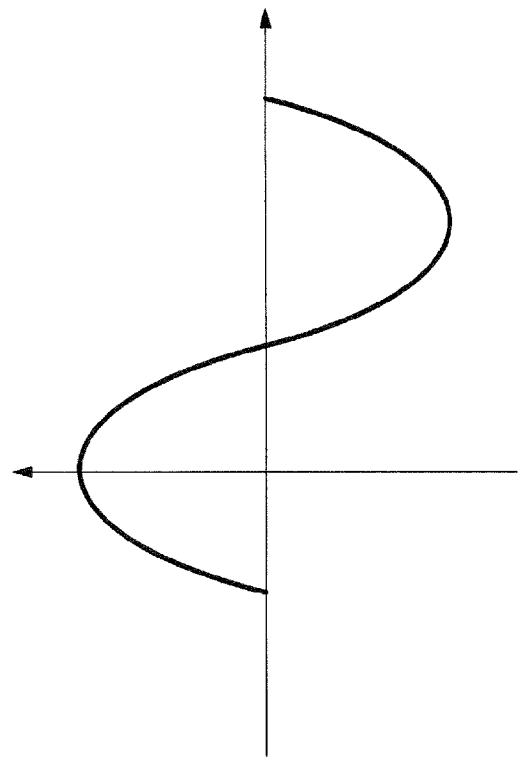

In addition, the filter may determine how wide in time the threshold crossing is itself As can be seen in FIG. 7a, the peaks are sharp and spaced apart in time at least a code pair transmission time, for this example. The peaks themselves are very narrow. A wider peak may be a DC wave form, or a noise value. An example of a broader peak due to a DC waveform is shown in FIG. 7b. A periodic waveform that has correlation peaks too frequently to be a code pair, such as a noise waveform, is shown in FIG. 7c.

It must be noted that the ideal result could be all 1s, indicating that the two codes are the same state, either inverted or non-inverted versions of the original code. The result could also be all 0s, indicating that one of the codes is an inverse of the other. The probability of a code matching another code to result in all 1s and the codes not being part of a code pair is extremely low. Similarly, the possibility of a code not matching another code to result in all 0s is also extremely small. As will be discussed further, it may be important to ascertain which one is inverted and which one is not, but at this stage it is only desirable to determine if the code pair is valid. While the discussion indicates that the results need to be all 1s or all 0s, this is just an example. As discussed earlier, thresholding of how many 1s or 0s is necessary to detect a match may be decided by the system designer.

Generally, for spread spectrum systems, a match against the code is considered a data 1, and a match against its inverse is considered a data 0. In embodiments of the invention, the first or second code, or both, may be bit-inverted as well as the second code being time reversed. This gives rise to the possibility of transmission of two bits of data with one transmission of a code pair. The various combinations and possible data interpretations are given in the table below.

TABLE 1

PN Code Pair Values

| First Code | Second Code | Data Value |
|---|---|---|
| Non-inverted | Non-inverted | 11 |
| Non-inverted | Inverted | 10 |
| Inverted | Non-inverted | 01 |
| Inverted | Inverted | 00 |

While the transmission rate would remain the same for the data, the data rate would double. Twice as much information is included in the transmission of the same amount of data. Current systems employing this type of analysis would have only 1 bit, either a high match for a 1 or a low match for a 0.

In another embodiment, a code pair could supply data as follows. The below example is for a 64-bit code pair, but could be extended or contracted to cover any length of code pairs. There would be one binary bit at detection, 1 for a high peak detect and 0 for a low peak detect. There would be 6 bits forming the index into a $2^6$ (64-bit) lookup table. There would then be one bit for the type of a match found, 1 for a match or 0 for a mismatch. The result is transmission of a byte of data for a particular code pair. This is four times the previous 2 bits used in similar schemes in current systems. Generally, the result would be two bits plus M bits of data, where M is derived from $2^M$=N bits code size.

Returning to FIG. 4, once a correlation peak is detected, the data can be stored and analyzed off line to determine the data values being transmitted. This adds to the efficiency of the system, as the codes no longer need to be matched for every clock cycle. The separation of code arrival detection and code analysis allows for several extensions in spread spectrum communications.

For example, the code pairs could be transmitted to a receiver that does not have any reference codes against which to compare the pseudo-noise codes. This may lead to patterns that are more likely to cause the match count to peak, leading to false matches. Some examples of these patterns include direct current (DC) or periodic patterns. The match count filter 46 may filter the match count peaks and restrict them to sharp peaks expected when a correctly formed pair is transmitted.

As mentioned above, the detected codes can be used or compared against reference values. For the example where the receiver does not have the reference codes against which to compare the detected codes, the receiver could use the code pair to set up communications with the transmitter. The receiver may take the pseudo-noise code value or combination of multiple receptions and use the value to attempt communication with the transmitter. The link could then proceed and the receiver could learn or be informed of new codes.

The receiver would 'learn' valid codes by detecting and verifying correctly formed code pairs. These would then be stored in a memory such as 48. Memory 48 is shown as being part of the correlator structure, but may be any type of storage located anywhere in the system. The storage of the codes could be optimized for later retrieval. This would allow for more efficient and less space-intensive look up logic circuitry. Alternatively, once the communications link is established, the codes could be shared between the transmitter and receiver, allowing the receiver to build up the storage of reference codes.

If reference codes were available, the comparison between the detected codes and the reference codes could be simplified because the comparison is done off-line from the reception of data. A 64-bit parallel comparator would no longer be necessary, as the comparison could be done in one of any number of ways. The reference codes could also have significance beyond just a data value of one or zero, depending upon the nature of the match.

One could apply different code sets to distinct devices or device types. For example, all cellular phones having a particular characteristic could be given a particular bit sequence or a particular set of codes. When the pseudo-noise codes are decoded to the particular bit sequence, or when the set of codes is compared against reference values, the receiver would recognize the transmitter as a cell phone. This is an example of a type of device.

In addition, or alternatively, a particular bit sequence or set of codes may be associated with a particular cell phone user. When the pseudo-noise codes are detected and compared to the reference values, the particular reference value indicates that the message is from a particular cell phone belonging to USER 1. This would be an example of a distinct device having a particular pseudo-noise code.

In yet another alternative, the codes could be transmitted to signal a particular event on a particular device. For example, a device may go off-line to perform regular maintenance, such as a virus scan or memory backup. When the device is back on-line and ready for traffic, it may send a particular code pair indicating its availability. This would be an example of an event type having a particular pseudo-noise code.

As discussed above, the comparison does not suffer from the same time restrictions as current systems. In current systems, the incoming code must be compared against a reference value very quickly, or data throughput suffers. In the embodiments of this invention, the analysis can be taken off-line and done in a more serialized fashion, requiring less logic and using the larger amount of available time.

Figure 8:
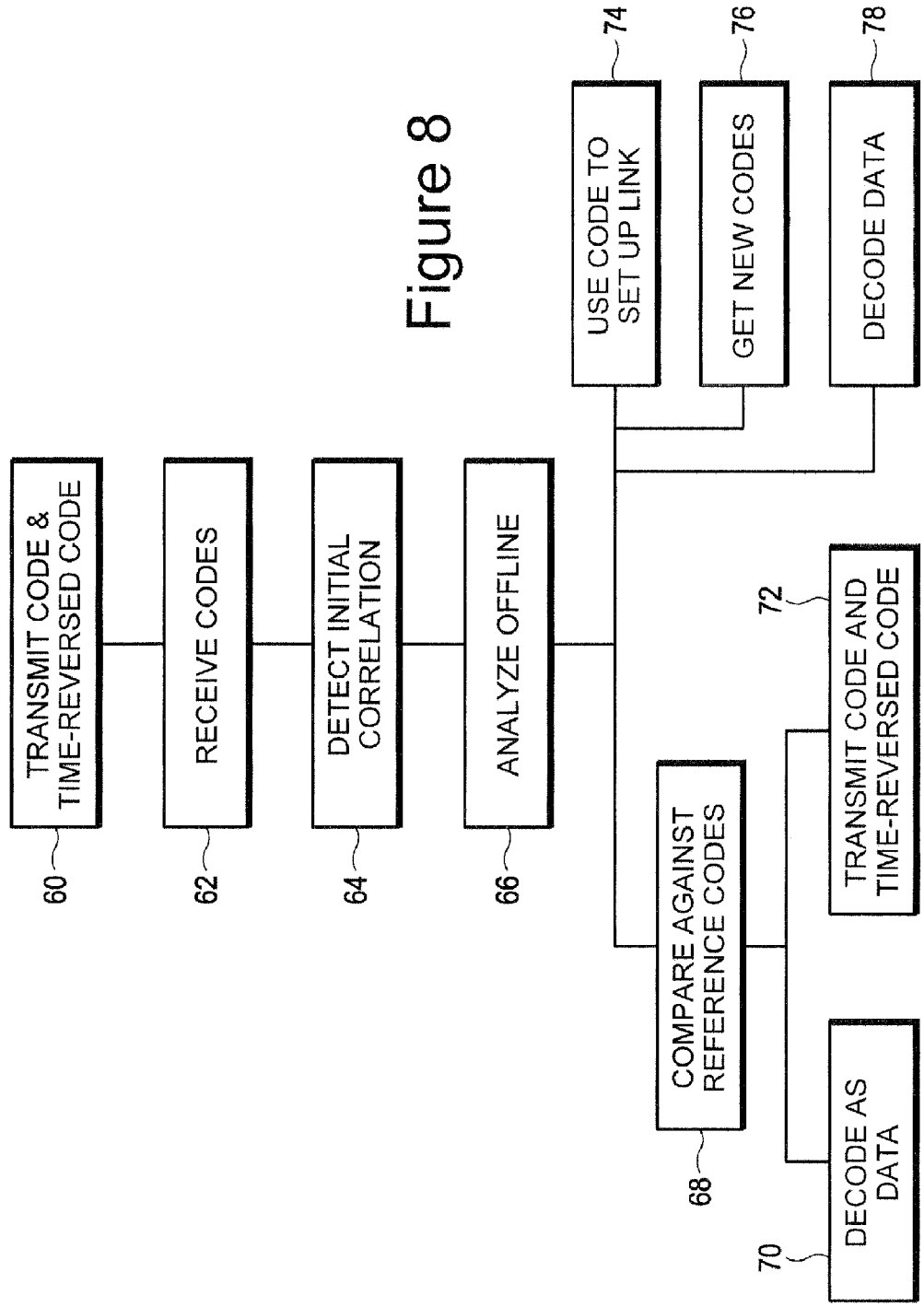
FIG. 8 shows a flow chart for a method of establishing communications using pseudo-noise code

In addition, the conventional art embodiment would require each code to have a structure available similar to the structure of FIG. 2. With a code pairing transmission, the only structure needed for however many codes desired would be similar to that shown in FIG. 5. Only two registers are needed to store the code and its time-reversed version. There is no more initial comparison circuitry needed if one uses 1 reference code or 64 reference codes, as an example. The only thing needed to be expanded is the memory available to store it. The size difference between a 1×N memory array and a 64×N memory array, where N is the width of the codes, is very small when compared to replicating the circuit of FIG. 2 64 times. This is enabled by the separation of the reception of the code and the analysis of the code. An embodiment for a method of communicating using pseudo-noise codes is shown in flowchart form in FIG. 8.

The pseudo-noise code and a time-reversed version of itself are transmitted as first and second codes at 60. The receiver then receives these codes at 62. If one were to assume that 1 bit of the code, sometimes referred to as 1 'chip,' were transmitted at 1 microsecond intervals, the receiver would then have a 128-bit arrival period of 128 microseconds. This is a significantly long time, allowing a significant amount of time to be allocated to the code lookup.

An initial correlation between the received codes is detected at 64. In one example above, the initial code was shifted in one direction into a first shift register. As the second code is being received, the first code is being shifted out of the first register into a second register in the opposite direction of the first. This results in the first code, the one not already time-reversed, to be stored in a time-reversed fashion. The initial correlation between the two time-reversed versions occurs more quickly and the code causing the detection is then stored for later analysis at 66.

Whether reference values are used in this particular system determines which branch the analysis takes. If the system uses reference values, the reference values are compared against the detected codes at 68. In addition, the codes could be decoded as data values at 70. As discussed above, it may be important to determine if the first code is inverted, the second code is inverted or both. In order to determine whether both the first and second codes are bit-wise inverted, they could be compared to the reference code. This allows the significance of that inversion, such as the data value being 00 from the table above, to be noted. The code may also be used to indicate a particular device, type of device, event, etc., optionally at 72.

If the system does not have any stored reference values, the code 74 may be used to set up the communication link at 74. Alternatively, or in addition, the codes may be decoded to determine the data values at 76. The two ends of the link then may exchange new codes at 78.

Thus, although there has been described to this point a particular embodiment for a method and apparatus for self-correlating pseudo-noise codes in spread spectrum communication systems, it is not intended that such specific references be considered as limitations upon the scope of this invention except in-so-far as set forth in the following claims.

What is claimed is:

1. A method of transmitting data using pseudo-noise codes, comprising:
   transmitting a first pseudo-noise code from a transmitter; and
   transmitting a second pseudo-noise code from the transmitter, wherein the second pseudo-noise code is a time-reversed version of the first pseudo-noise code and a relationship between the first and second codes in each transmission represents two bits of data for each one transmission by forming the first pseudo-noise code and the second pseudo-noise code into a pair.

2. The method of claim 1, transmitting a second pseudo-noise code further comprising transmitting a second pseudo-noise code that is bit-wise inverted from the first pseudo-noise code.

3. The method of claim 1, transmitting a first pseudo-noise code further comprises transmitting a first pseudo-noise code as a bit-wise inverted version of an original code.

4. The method of claim 1, the method comprising using the first and second pseudo-noise codes to establish a communications link with a receiver of the first and second codes.

5. The method of claim 1, transmitting a first pseudo-noise code further comprising transmitting a pseudo-noise code wherein selection of the code depends upon a type of transmitting device.

6. The method of claim 1, transmitting a first pseudo-noise code further comprising transmitting a pseudo-noise code wherein selection of the code depends upon a transmitting device.

7. The method of claim 1, transmitting a first pseudo-noise code further comprising transmitting a pseudo-noise code wherein selection of the code depends upon an event.

8. A method of receiving communications codes, comprising:
   receiving a transmission including first and second pseudo-noise codes formed into a pair; wherein the first pseudo-noise codes is a time-reversed version of the second pseudo-noise code;
   comparing the first received pseudo-noise code to the second received pseudo-noise code;

detecting a match between the first and second pseudo-noise codes based upon a match count peak; and sending an enable signal to a memory to cause the memory to store at least one of the first and second codes, the enable signal based upon a match detection result.

9. The method of claim 8, the method comprising filtering outputs resulting from the detecting to identify sharp peaks.

10. The method of claim 8, the method comprising storing the at least one of the first and second codes further comprising storing the code for later analysis as a received code.

11. The method of claim 10, the method comprising comparing the received code against at least one reference value.

12. The method of claim 11, the method comprising using at least a part of the received code as an index into a lookup table.

13. A device, comprising:
a receiver to receive a pair of pseudo-noise codes;
a first register to store a first pseudo-noise code;
a second register to store a second pseudo-noise code in time-reversed order;
a comparison circuit to compare contents of the first register to contents of the second register and output a match count result; and
a memory electrically coupled to the comparison circuit to receive an enable signal from the comparison circuit, the enable signal being based upon a match count result.

14. The device of claim 13, the first register further comprising a shift register.

15. The device of claim 13, the second register further comprising a shift register to shift data in a direction opposite a direction of the first register.

16. The device of claim 13, the device comprising a filter to filter the result and identify sharp peaks.

17. The device of claim 13, the comparison circuit comprising an exclusive OR gate array.

18. The device of claim 13, the memory to store one of the first pseudo-noise code or the second pseudo-noise code as a received code.

* * * * *